(12) United States Patent
Lee et al.

(10) Patent No.: US 9,395,555 B2
(45) Date of Patent: Jul. 19, 2016

(54) STRUCTURE OF EYEGLASSES

(71) Applicant: TRIMAX SAFETY CORP., Tainan (TW)

(72) Inventors: Shih-I Lee, Tainan (TW); Ching-Hsiu Chan, Tainan (TW)

(73) Assignee: Trimax Safety Corp., Tainan (TW)

( * ) Notice: Subject to any disclaimer, the term of this patent is extended or adjusted under 35 U.S.C. 154(b) by 27 days.

(21) Appl. No.: 14/582,141

(22) Filed: Dec. 23, 2014

(65) Prior Publication Data

US 2016/0178931 A1  Jun. 23, 2016

(51) Int. Cl.
*G02C 5/22* (2006.01)
(52) U.S. Cl.
CPC ............ *G02C 5/2281* (2013.01); *G02C 5/2209* (2013.01); *G02C 5/2254* (2013.01)
(58) Field of Classification Search
CPC ...... G02C 5/22; G02C 5/2209; G02C 5/2218; G02C 5/2254; G02C 5/2272; G02C 5/229
USPC ............................................ 351/153; 16/228
See application file for complete search history.

(56) References Cited

U.S. PATENT DOCUMENTS 6,302,539 B1 * 10/2001 Tsai ................... G02C 5/2209
16/228
2014/0135804 A1 * 5/2014 Weisenburgh, II ................. A61B 17/320092
606/169

* cited by examiner

*Primary Examiner* — Huy K Mai
(74) *Attorney, Agent, or Firm* — Wang Law Firm, Inc.

(57) ABSTRACT

A structure of eyeglasses is disclosed. The structure of eyeglasses includes a frame and a temple. The frame includes a trench. A bottom wall of the trench has a first second interference points. The temple is rotatably connected to the frame, rotates relative to the frame along a central fixed point, and includes a protruding portion. The protruding portion has a protruding point with a furthest distance to the central fixed point. When the temple rotates, the protruding portion moves in the trench and the protruding point is in contact with the bottom wall of the trench between the first and second interference points. The distances from the first and second interference points to the central fixed point are substantially equal to the furthest distance. A distance from the bottom wall of the trench between the first and second interference points is substantially smaller than the furthest distance.

8 Claims, 8 Drawing Sheets

STRUCTURE OF EYEGLASSES

BACKGROUND OF THE INVENTION

1. Field of the Invention

The present invention generally relates to a structure of eyeglasses, in particular with respect to a structure of eyeglasses a temple of which can automatically move to a predetermined position.

2. Description of the Related Art

Recently, the number of people wearing eyeglasses is in an increasing tendency. People often wear eyeglasses to adjust their sight, to protect their eyes from being damaged, or look fancy.

Regarding a commonly used eyeglasses, if a pair of eyeglasses is not folded in a closed position properly after being put off, they are vulnerable to external forces. For example, when unfolded eyeglasses drop from a desk to ground, a temple and a frame are easily separated from each other by impact. Besides, in some places like a chemical laboratory of school, a lot of pairs of eyeglasses need to be stored for the purpose of safety. However, some people do not have patient to fold the eyeglasses properly after usage, and then extra labor or storages space may be required to store those eyeglasses.

As a result, the creator of the present invention designs a structure of eyeglasses which aims for automatically adjusting the eyeglasses in a proper close position after usage.

SUMMARY OF THE INVENTION

In view of the above-mentioned problem, a structure of eyeglasses is provided to performance an automatic folding function.

According to the objective of the present invention, a structure of eyeglasses is provided. The structure of eyeglasses includes a frame and a temple. The frame includes a trench. A bottom wall of the trench has a first interference point and a second interference point. The temple is rotatably connected to the frame. The temple rotates relative to the frame along a central fixed point, and includes a protruding portion. The protruding portion has a protruding point with a furthest distance D to the central fixed point. When the temple rotates, the protruding portion moves in the trench and the protruding point is in contact with the bottom wall of the trench between the first interference point and the second interference point. A first distance D1 from the first interference point to the central fixed point is substantially equal to the furthest distance D, a second distance D2 from the second interference point to the central fixed point is substantially equal to the furthest distance D, and a third distance from the bottom wall of the trench between the first interference point and the second interference point to the central fixed point CP is substantially smaller than the furthest distance D.

Preferably, the frame may include a first connector, the temple may include a second connector, and the temple is rotatably connected to the frame by an engagement between the first connector and the second connector.

Preferably, the first connector may be a recess or an opening, and the second connector may be a bulge.

Preferably, the frame may include a ramp on a surface of the frame near the first connector.

Preferably, the bottom wall of the trench may have third interference point between the first interference point and the second interference point, the third interference point has a smallest distance D3 to the central fixed point, and the third interference point is closer to the first interference point than to the second interference point.

Preferably, the protruding portion may be in an L-shape.

Preferably, the protruding portion may be in the L-shape with a round angle.

Preferably, the frame may include a first blocker, and the temple may include a second blocker. When the protruding point is substantially in contact with the first interference point, the first blocker engages the second blocker.

To sum up, the structure of eyeglasses of the present invention may have one or more following advantages:

(1) The structure of eyeglasses of the present invention may automatically adjust the temple and the frame to a predetermined relative position by a restoring force generated from a deformation of material of the frame and the temple.

(2) The structure of eyeglasses of the present invention may use the convex and concave connectors to rotatably connect the temple to the frame without using screws or the like.

DETAILED DESCRIPTION OF THE PREFERRED EMBODIMENTS

Figure 1:
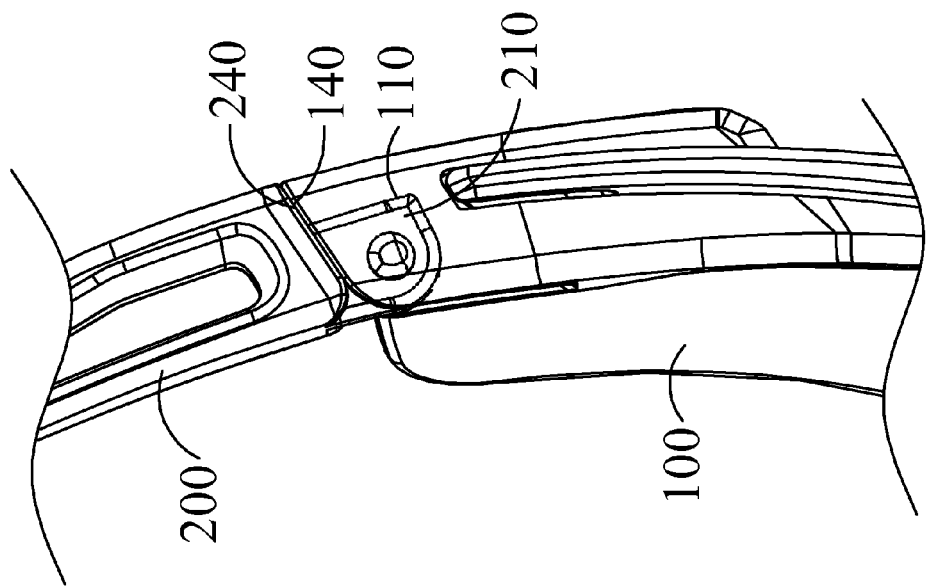
FIG. 1 is an assembly diagram of structure of eyeglasses in accordance with the present invention.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Figure 2A:
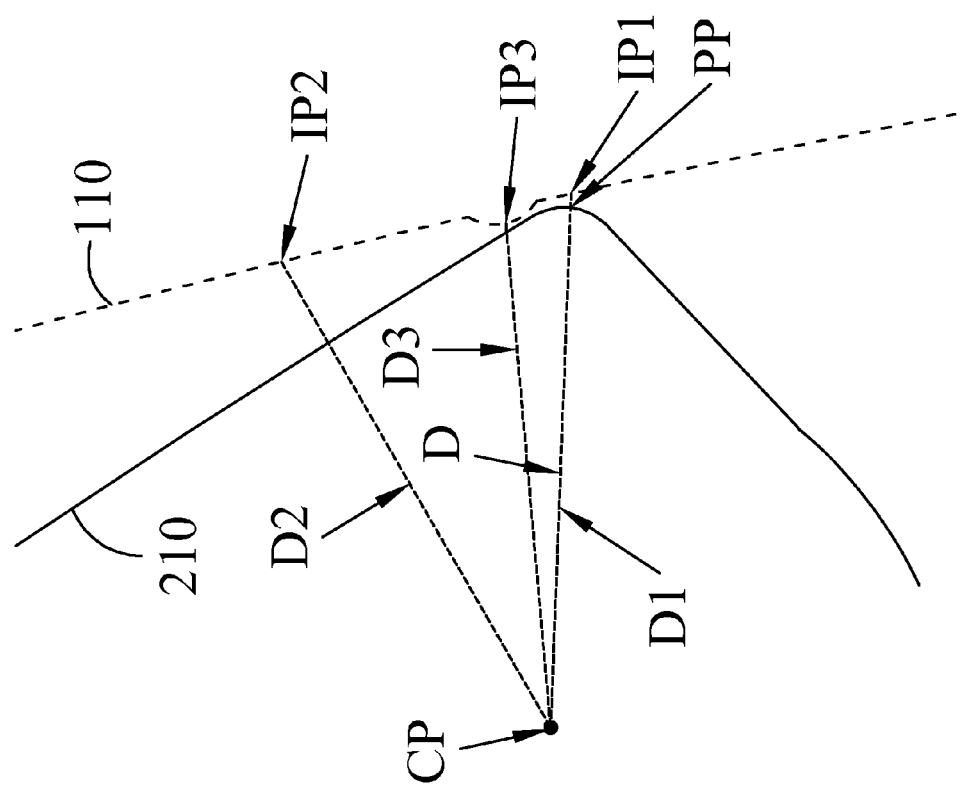
FIGS. 2A to 2C are schematic diagrams showing the temple and the frame are in different relative rotation positions.
Figure 2B:
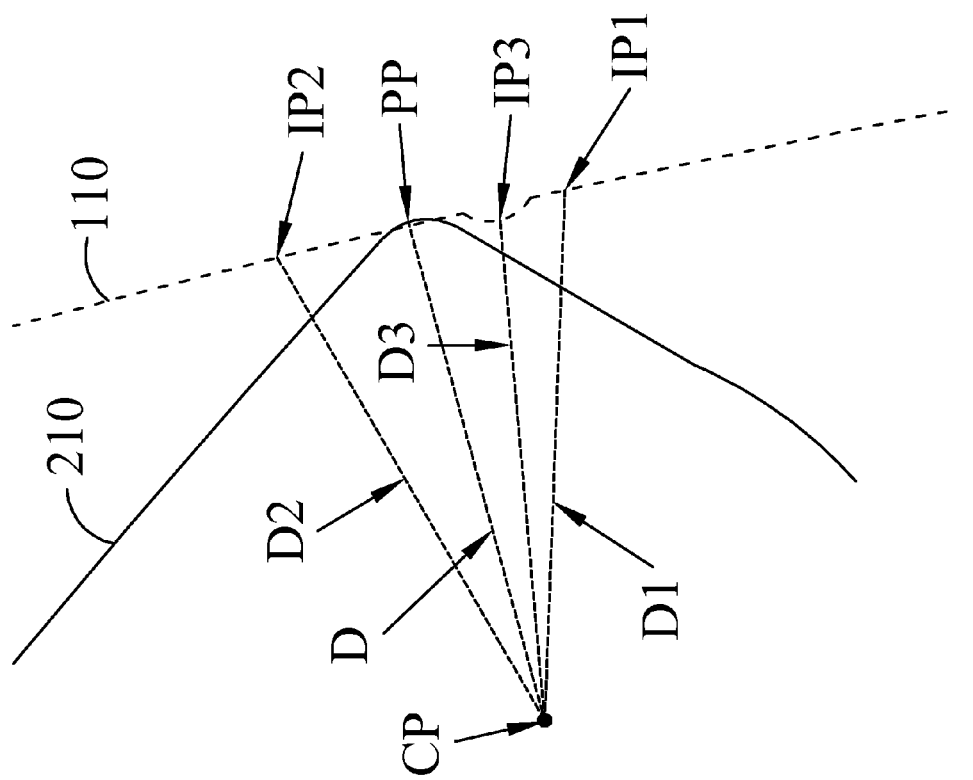
Figure 2C:
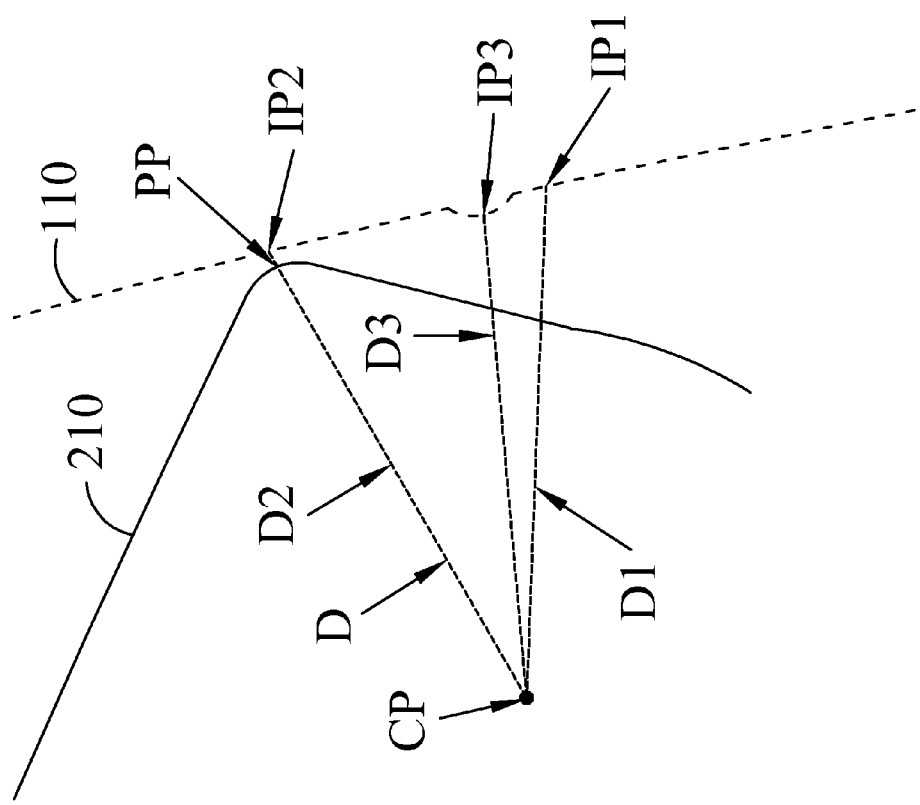

With reference to FIG. 1, that is an assembly diagram of structure of eyeglasses in accordance with the present invention. As shown in the FIG. 1, the structure of eyeglasses includes a frame 100 and a temple 200. The frame 100 includes a trench 110. The temple 200 is rotatably connected to the frame 100. The temple 200 rotates relative to the frame 100 along a central fixed point CP, and includes a protruding portion 210. With reference to FIGS. 2A to 2C, that are schematic diagrams showing the temple 200 and the frame 100 are in different relative rotation positions. As shown in the FIGS. 2A to 2C, a bottom wall of the trench 110 has a first interference point IP1 and a second interference point IP2 (in FIGS. 2A to 2C, the curve indicated by the trench 110 is the curve formed by the bottom wall of the trench 110). The protruding portion 210 has a protruding point PP with a furthest distance D to the central fixed point CP. When the temple 200 rotates, the protruding portion 210 moves in the trench 110 and the protruding point PP is in contact with the bottom wall of the trench 110 between the first interference point IP1 and the second interference point IP2. A first distance D1 from the first interference point IP1 to the central fixed point CP is substantially equal to the furthest distance D, a second distance D2 from the second interference point IP2 to the central fixed point CP is substantially equal to the furthest distance D, and a third distance, which is the distance from the bottom wall of the trench 110 between the first interference point IP1 and the second interference point IP2 to the central fixed point CP, is substantially smaller than the furthest distance D.

As stated above, the bottom wall of the trench 110 has a first interference point IP1 and a second interference point IP2. The temple 200 is rotatably connected to the frame 100, so the temple 200 can only rotate relative to the frame 100, and the protruding portion 210 of the temple 200 moves in the trench 110 of the frame 100. Here, when the protruding point PP of the protruding portion 210 is at the first interference point IP1, the relative position between the frame 100 and the temple 200 corresponds to a proper open state of the eyeglasses. When the protruding point PP of the protruding portion 210 is at the second interference point IP2, the relative position between the frame 100 and the temple 200 corresponds to a proper close state of the eyeglasses. Please refer to FIG. 2A, because the furthest distance D, which is between the protruding point PP and the central fixed point CP, and the first distance D1, which is between the first interference point IP1 and the central fixed point CP, are substantially equal to each other, the temple 200 can be approximately fixed in a proper open position when the protruding point PP of the protruding portion 210 is at the first interference point IP1. Similarly, please refer to FIG. 2C, the temple 200 can be approximately fixed in a proper close position when the protruding point PP of the protruding portion 210 is at the second interference point IP2. Please refer to FIG. 2B, when the protruding point PP is between the first interference point IP1 and the second interference point IP2, since the a third distance, which is the distance from the bottom wall of the trench 110 between the first interference point IP1 and the second interference point IP2 to the central fixed point CP, is substantially smaller than the furthest distance D, the protruding portion 210 and the bottom of the trench 110 are partially deformed. Therefore, a restoring force is generated due to such deformation. Since the temple 200 is rotatably connected to the frame 100, a torque force is generated by the restoring force, and the protruding point PP is pushed toward the second interference point IP2. Thus, the temple 200 and the frame 100 automatically and gradually form the proper close state. The difference between the bottom wall of the trench 110 and the central fixed point CP can be subtle. Hence, the protruding portion 210 can smoothly move in the trench 110 and the torque force generated by the deformation can still push the protruding portion 210 to the predetermined positions. Only a small amount of initial force is required to start the automatic adjustment process between the frame 100 and the temple 200.

In another embodiment, the first interference IP1 and the second interference IP2 may not exactly correspond to the proper open and close positions of the structure of eyeglasses, respectively. The above stated torque force pushes the protruding point PP passing through the first interference point IP1 to move the structure of eyeglasses in the proper open position, or passing through the second interference point IP2 to move the structure of eyeglasses in the proper close position.

Figure 3A:
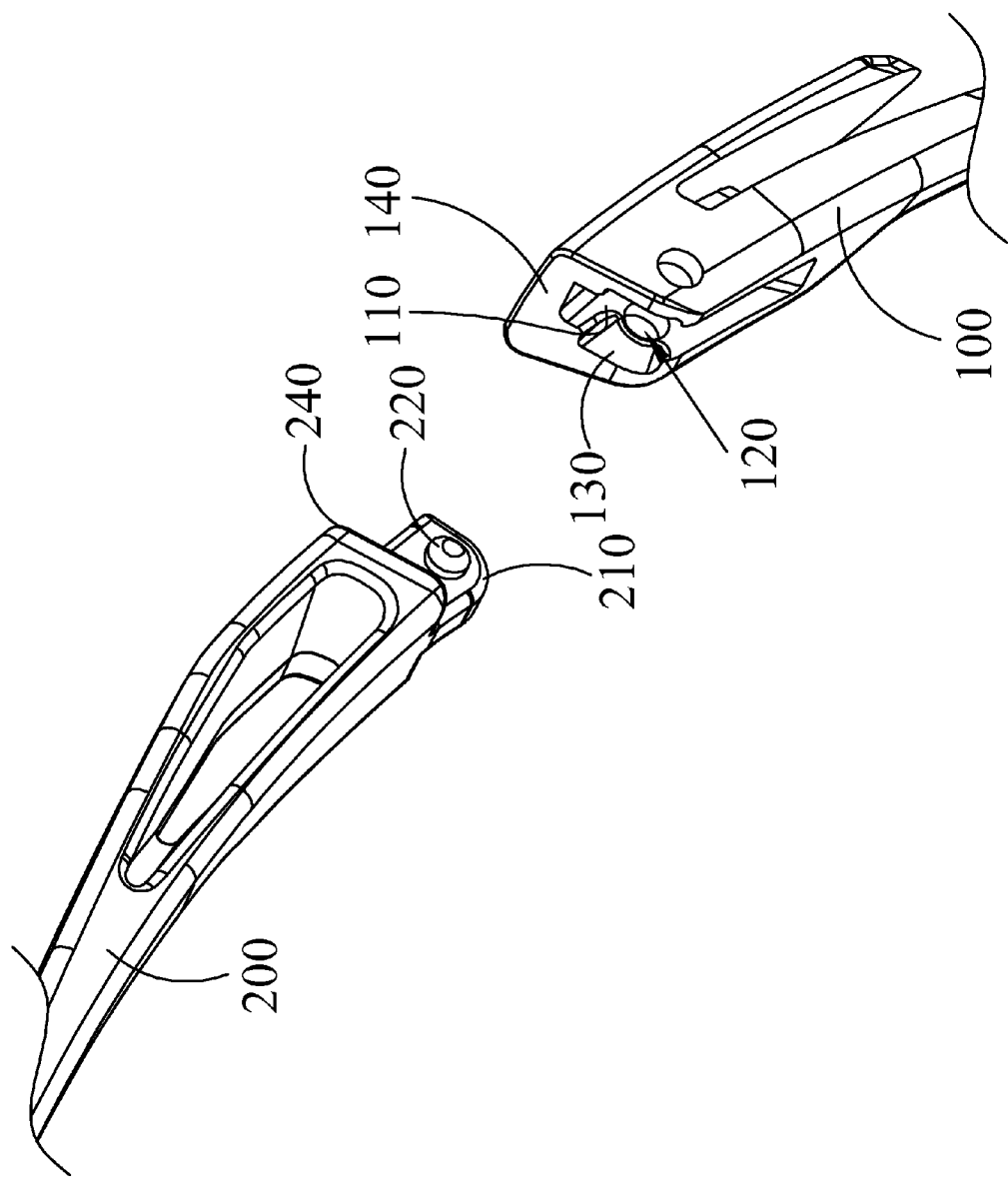
FIGS. 3A to 3D are exploding diagrams respectively showing the first to forth embodiments of the connectors of the structures of eyeglasses of the present invention.

With reference to FIG. 3A, that is an exploding diagram respectively showing the first of the connectors of the structures of eyeglasses of the present invention. As shown in the FIG. 3A, the frame 100 may include a first connector 120, the temple 200 may include a second connector 220, and the temple 200 is rotatably connected to the frame 100 by an engagement between the first connector 120 and the second connector 220. In particular, the first connector 120 may be a recess or an opening, and the second connector may be a bulge 220.

Figure 3B:
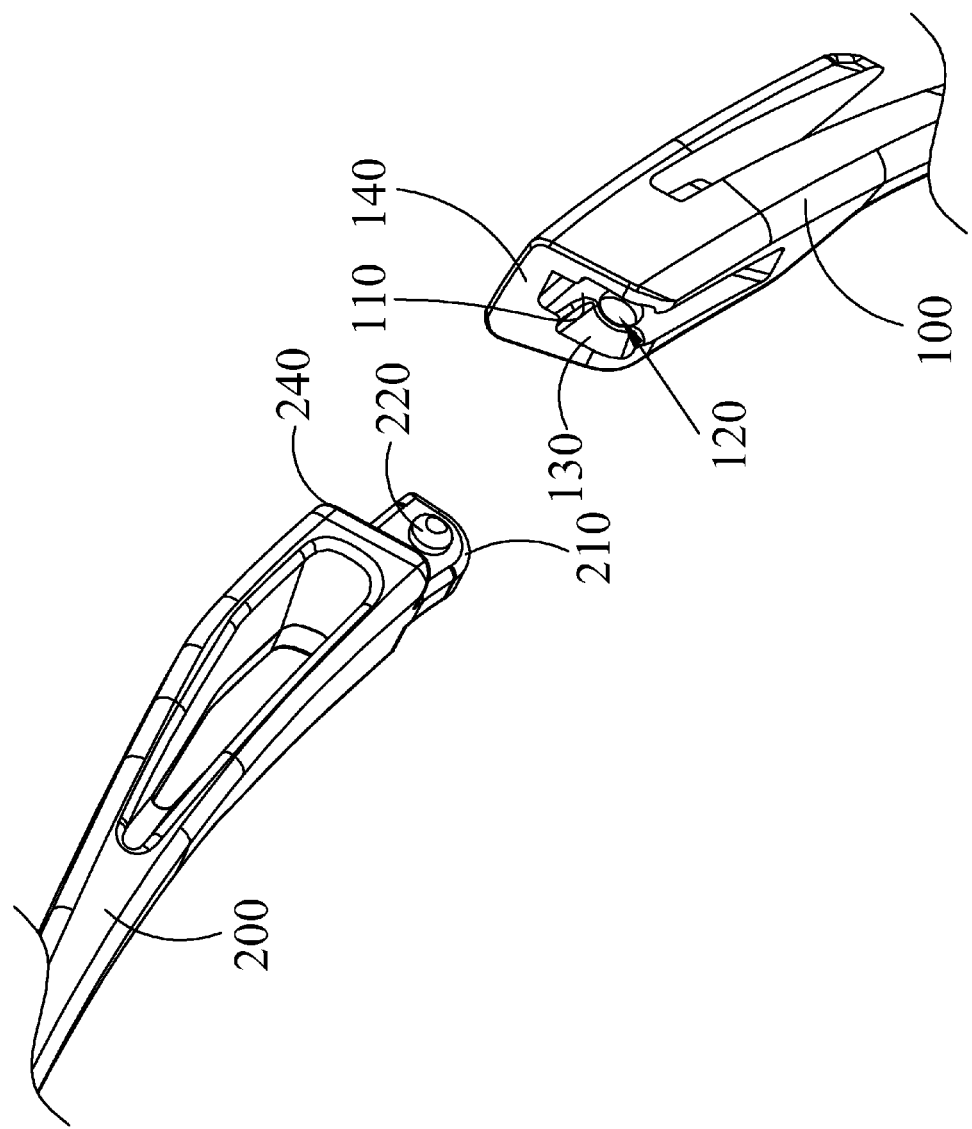
Figure 3C:
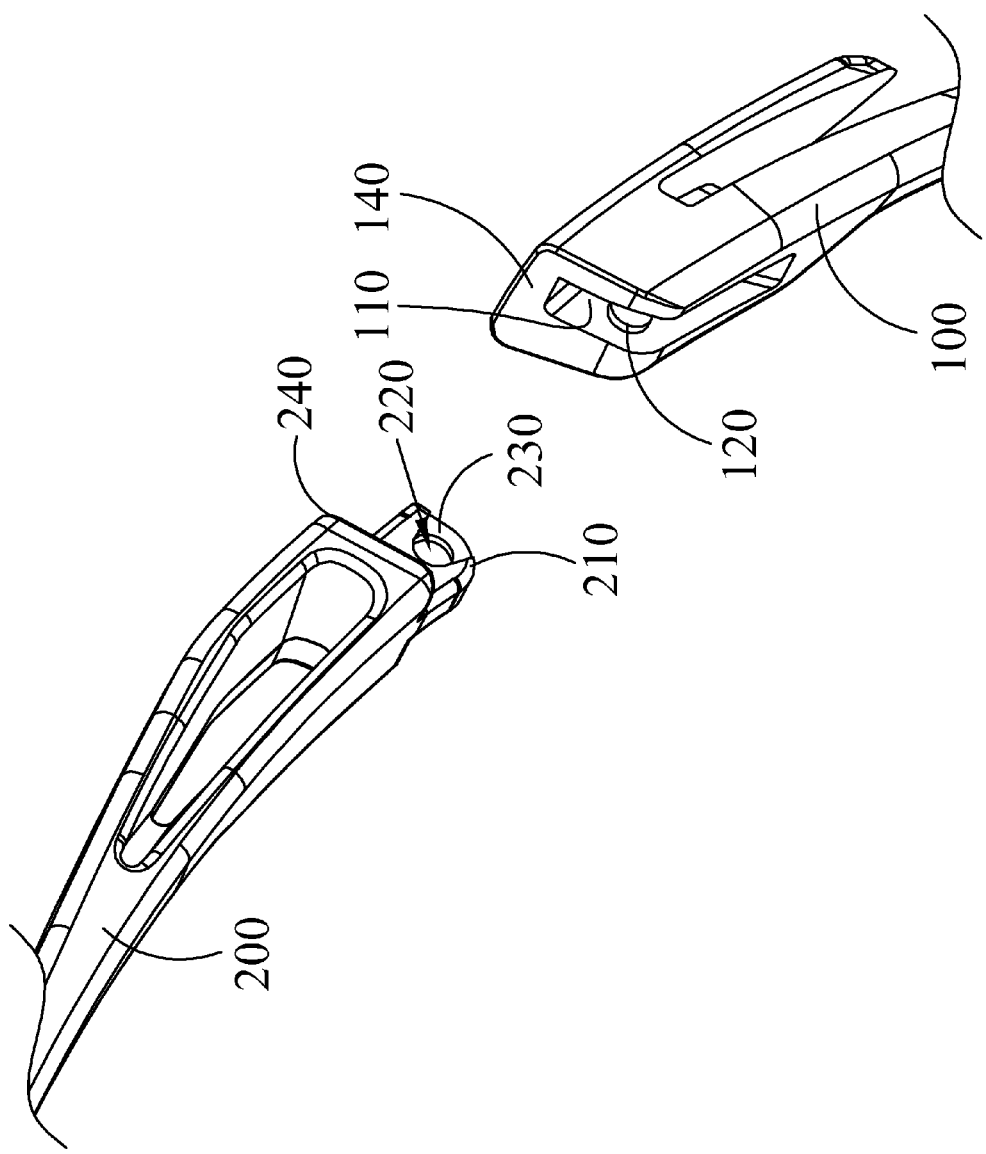
Figure 3D:
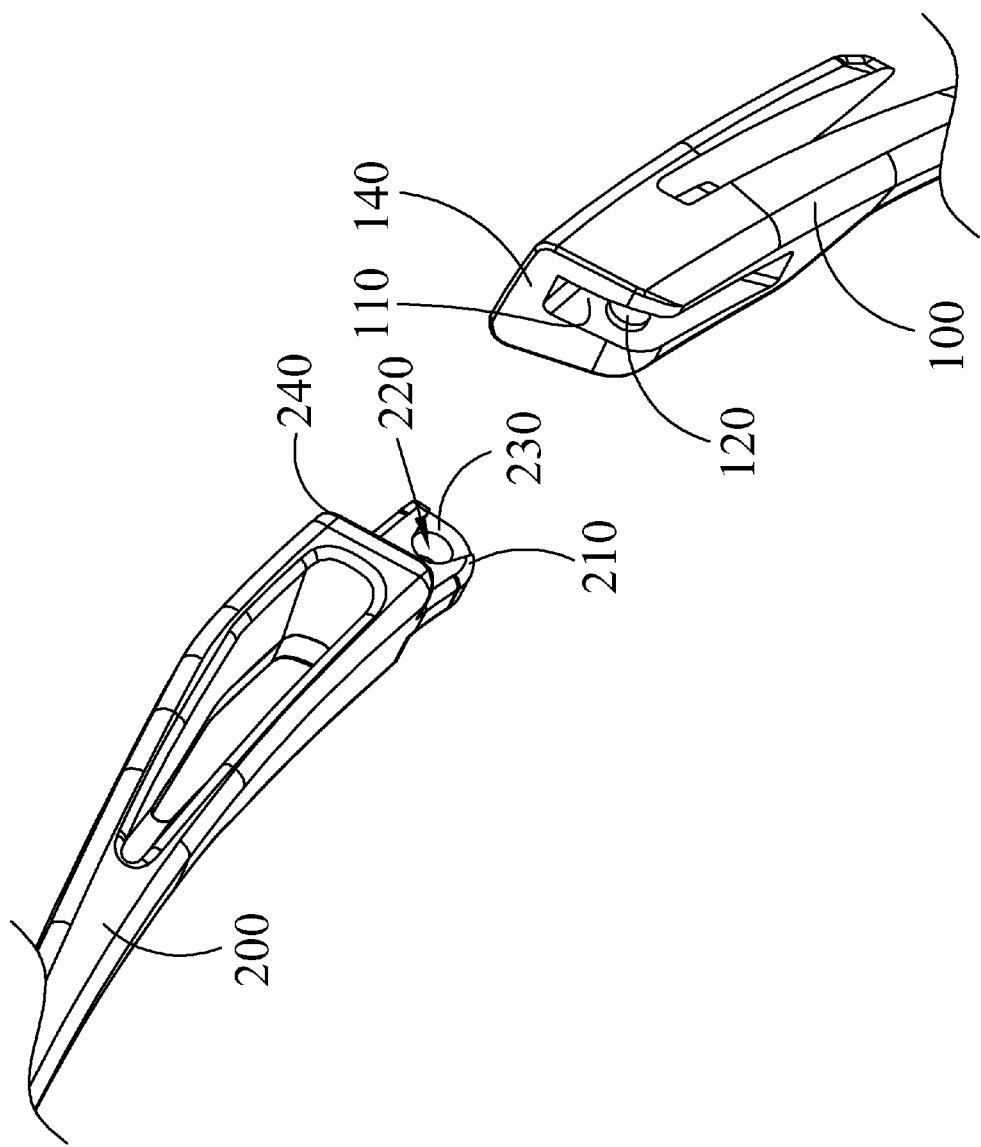

The first connector 120 may be integrally formed with the frame 100, and the second connector 220 may be integrally formed with the temple 200. By cooperation of the first connector 120 and the second connector 220, the temple 200 can be rotatably connected to the frame 100. Please refer to FIG. 3A. In the embodiment of FIG. 3A, the first connector 120 is an opening, and the second connector 220 is a bulge. Therefore, when the second connector 220 engages within the first connector 120, the temple 200 can be rotatably connected to the frame 100, and no extra assembling members, such as screws or hinges, is required. However, the present invention is not limited thereto. Please refer to FIG. 3B. In the embodiment of FIG. 3B, the first connector 120 is a recess, and the second connector 220 is a bulge. The first connector 120 does not penetrate the bulk of the frame 100. The convex and concave structures can be exchanged between the first connector 120 and the second connector 220. For example, please refer to FIG. 3C. In the embodiment of FIG. 3C, the first connector 120 is a bulge, and the second connector 220 is an opening. Please refer to FIG. 3D. In the embodiment of FIG. 3D, the first connector 120 is a bulge, and the second connector 220 is a recess.

Please refer back to FIG. 3A. As shown in FIG. 3A, the frame 100 may include a ramp 130 on a surface of the frame 100 near the first connector 120.

In the embodiment of FIG. 3A, the first connector 120 is an opening, the second connector 220 is a bulge, and a ramp 130 is formed near the first connector 120. Thus, while assembling process, the second connector 220 can be easily push inward to engage the first connector 120. Please refer back to FIG. 3B. In the embodiment of FIG. 3B, the ramp 130 is still formed near the first connector 120 that is a recess. In contrast, if the convex and concave structures are exchanged between the first connector 120 and the second connector 220, the ramp can be formed near the concave structure. Please refer back to FIG. 3C, the first connector 120 is a bulge, the second connector 220 is an opening, and a ramp 230 is formed near the second connector 220. Alternatively, please refer back to FIG. 3D, the first connector 120 is a bulge, the second connector 220 is a recess, and a ramp 230 is formed near the second connector 220.

Please refer back to FIGS. 2A to 2C, as shown in FIGS, the bottom wall of the trench 110 may have third interference point IP3 between the first interference point IP1 and the second interference point IP2, the third interference point IP3 has a smallest distance D3 to the central fixed point CP, and the third interference point IP3 is closer to the first interference point IP1 than to the second interference point IP2.

There can be one third interference point IP3 on the bottom wall of the trench 110. The third interference point IP3 may have the smallest distance D3 to the central fixed point CP between the first interference point IP1 and the second interference point IP2. Specifically, there can be only one third interference point IP3 between the first interference point IP1 and the second interference point IP2. The third interference point IP3 can be closer to the interference point IP1 than to the second interference point IP2, and the distance between the bottom wall of the trench 110 and the central fixed point CP from the third interference point IP3 to the second interference point IP2 can gradually increase. Therefore, when the structure of eyeglasses is to be closed, only small amount force is required to push the protruding point PP of the protruding portion 210 passing through the third interference point IP3, and then the protruding point PP automatically moves to the second interference point IP2 by the restoring force of material. The gradual change of the distance between the bottom wall of the trench 110 and the central fixed point CP ensures that the protruding portion 210 smoothly moves in the trench 110 without being stuck in a certain point between the third interference point IP3 and the second interference point IP2. Please refer to the arrow in FIG. 2B, which indicates the rotation direction of the protruding portion 210. Since the third interference point IP3 is closer to the first interference point IP1, when the protruding point PP is located between the second interference point IP2 and the first interference point IP1, it is more possible that the protruding portion 210 receives the torque force causing counterclockwise rotation rather than clockwise rotation. Therefore, the protruding point PP is more likely to move to the second interference point IP2 than the first interference point IP1. In other words, when the structure of eyeglasses is not unfolded completely in the proper close position, the temple 200 is more likely to automatically move to the proper close position, and the possibility of being damaged by the impact can be reduced.

Please refer back to FIG. 1. As shown in FIG. 1, the protruding portion 210 may be in an L-shape. More specifically, the protruding portion 210 may be in the L-shape with a round angle.

For simplifying the manufacturing process, the protruding portion 210 of the temple 200 can be designed as being in an L-shape. In particular, if the protruding portion 210 is in the L-shape with a round angle, the protruding point PP can be a point on the surface of the round angle. Since the protruding point PP need to contact the bottom surface of the trench 110, the round angle of the protruding portion 210 can decrease the damage caused by friction. Therefore, the automatic moving function between the frame 100 and the temple 200 can maintain longer due to the decreased friction loss of material.

Please refer back to FIG. 1. As shown in FIG. 1, the frame 100 may include a first blocker 140, and the temple 200 may include a second blocker 240. When the protruding point PP is substantially in contact with the first interference point IP1, the first blocker 140 engages the second blocker 240.

When the protruding point PP of the protruding portion 210 contacts the first interference point IP1, the temple 200 is in a proper open position relative to the frame 100. A fixed mechanism is desired to keep the temple 200 from rotating further. Therefore, the frame 100 may have the first blocker 140, and the temple 200 may have the second blocker 240. The first blocker 140 can be formed in a concave shape, and the second blocker 240 can be formed in a convex shape. While the protruding point PP contact the first interference point IP1, the second blocker 240 is exactly fit in the first blocker 140, and thus the temple 200 cannot clockwise rotate further in FIG. 1. It should be noted that the present invention is not limited thereto. For example, the first blocker 140 can be formed in a convex shape, and the second blocker 240 can be formed in a concave shape.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A structure of eyeglasses, comprising:
   a frame comprising a trench, a bottom wall of the trench comprising a first interference point and a second interference point; and
   a temple rotatably connected to the frame, rotating relative to the frame along a central fixed point, and comprising a protruding portion, the protruding portion comprising a protruding point with a furthest distance D to the central fixed point,
   wherein when the temple rotates, the protruding portion moves in the trench and the protruding point is in contact with the bottom wall of the trench between the first interference point and the second interference point,
   wherein a first distance D1 from the first interference point to the central fixed point is substantially equal to the furthest distance D, a second distance D2 from the second interference point to the central fixed point is substantially equal to the furthest distance D, and a third distance from the bottom wall of the trench between the first interference point and the second interference point to the central fixed point is substantially smaller than the furthest distance D.

2. The structure of eyeglasses as claimed in claim 1, wherein the frame comprises a first connector, the temple comprises a second connector, and the temple is rotatably connected to the frame by an engagement between the first connector and the second connector.

3. The structure of eyeglasses as claimed in claim 2, wherein the first connector is a recess or an opening, and the second connector is a bulge.

4. The structure of eyeglasses as claimed in claim 3, wherein the frame comprises a ramp on a surface of the frame near the first connector.

5. The structure of eyeglasses as claimed in claim 1, wherein the bottom wall of the trench comprises a third interference point between the first interference point and the second interference point, the third interference point has a smallest distance D3 to the central fixed point, and the third interference point is closer to the first interference point than to the second interference point.

6. The structure of eyeglasses as claimed in claim 1, wherein the protruding portion is in an L-shape.

7. The structure of eyeglasses as claimed in claim 6, wherein the protruding portion is in the L-shape with a round angle.

8. The structure of eyeglasses as claimed in claim 1, wherein the frame comprises a first blocker, and the temple comprises a second blocker, and
   wherein when the protruding point is substantially in contact with the first interference point, the first blocker engages the second blocker.

* * * * *